United States Patent
Demant et al.

(10) Patent No.: US 10,417,248 B2
(45) Date of Patent: Sep. 17, 2019

(54) FIELD EXTENSION IN DATABASE SYSTEM

(71) Applicant: SAP SE, Walldorf (DE)

(72) Inventors: Hilmar Demant, Karlsdorf (DE); Georg Wilhelm, Heidelberg (DE)

(73) Assignee: SAP SE, Walldorf (DE)

( * ) Notice: Subject to any disclaimer, the term of this patent is extended or adjusted under 35 U.S.C. 154(b) by 555 days.

(21) Appl. No.: 14/842,614

(22) Filed: Sep. 1, 2015

(65) Prior Publication Data
US 2017/0060878 A1   Mar. 2, 2017

(51) Int. Cl.
*G06F 17/30* (2006.01)
*G06F 16/25* (2019.01)
*G06F 9/54* (2006.01)
*G06F 16/21* (2019.01)

(52) U.S. Cl.
CPC ........... *G06F 16/252* (2019.01); *G06F 9/54* (2013.01); *G06F 16/211* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 2008/0028068 A1* | 1/2008 | Nochta | H04W 28/08 709/224 |
| 2014/0089635 A1* | 3/2014 | Shifer | G06F 9/30076 712/30 |
| 2014/0258032 A1* | 9/2014 | Psota | G06Q 30/02 705/26.35 |

* cited by examiner

*Primary Examiner* — Sana A Al-Hashemi
(74) *Attorney, Agent, or Firm* — Fountainhead Law Group P.C.

(57) ABSTRACT

In one embodiment, a method stores extension logic for a business context for an application in a backend database system. The extension logic is stored with respect to a database table, business logic to handle transactions in the backend system, and an application programming interface to the application. A request for a custom field is received through a runtime version of the application, the custom field specifying a business context in which the custom field is associated. The method determines the extension logic associated with the business context in the backend database system. Further, the method uses the extension logic to extend the database table with the custom field, extend the business logic to handle transactions for the custom field in the backend system, and extend the application programming interface to the application. The custom field is extended during runtime of the application.

20 Claims, 6 Drawing Sheets

FIELD EXTENSION IN DATABASE SYSTEM

BACKGROUND

A service provider that develops a software system attempts to anticipate all the features that are needed by the service requestor. This includes all features of the user interface and specifically certain fields found in the user interface of the application. While using the application, a service requestor may determine that the application does not provide all the features that are needed by the service requestor. For example, the service requestor may desire a custom field in the user interface. Typically, to extend the application, the service requestor must communicate with a developer with the specifications for the custom field. This is because the software system is typically complex and also located on-site at the service requestor. Then, the developer would extend the software system for the service requestor. This process, however, may take some time and also cost the service requestor money.

SUMMARY

In one embodiment, a method stores extension logic for a business context for an application in a backend database system. The extension logic is stored with respect to a database table, business logic to handle transactions in the backend system, and an application programming interface to the application. A request for a custom field is received through a runtime version of the application, the custom field specifying a business context in which the custom field is associated. The method determines the extension logic associated with the business context in the backend database system. Further, the method uses the extension logic to extend the database table with the custom field, extend the business logic to handle transactions for the custom field in the backend system, and extend the application programming interface to the application. The custom field is extended during runtime of the application.

In one embodiment, a non-transitory computer-readable storage medium contains instructions, that when executed, control a computer system to be configured for: storing extension logic for a business context for an application in a backend database system, wherein the extension logic is stored with respect to a database table, business logic to handle transactions in the backend system, and an application programming interface to the application; receiving a request for a custom field through a runtime version of the application, the custom field specifying a business context in which the custom field is associated; determining the extension logic associated with the business context in the backend database system; and using the extension logic to extend the database table with the custom field, extend the business logic to handle transactions for the custom field in the backend system, and extend the application programming interface to the application, wherein the custom field is extended during runtime of the application.

In one embodiment, an apparatus includes: one or more computer processors; and a non-transitory computer-readable storage medium comprising instructions, that when executed, control the one or more computer processors to be configured for: storing extension logic for a business context for an application in a backend database system, wherein the extension logic is stored with respect to a database table, business logic to handle transactions in the backend system, and an application programming interface to the application; receiving a request for a custom field through a runtime version of the application, the custom field specifying a business context in which the custom field is associated; determining the extension logic associated with the business context in the backend database system; and using the extension logic to extend the database table with the custom field, extend the business logic to handle transactions for the custom field in the backend system, and extend the application programming interface to the application, wherein the custom field is extended during runtime of the application.

The following detailed description and accompanying drawings provide a better understanding of the nature and advantages of particular embodiments.

DETAILED DESCRIPTION

Described herein are techniques for a field extension system in a software system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a method for extending a back-end software system via a front-end user interface. A service requestor may extend the software system during runtime of an application of the software system. In one embodiment, during run time, the user may add a custom field to the user interface of the application.

Once the request for the custom field is received, the back-end software system adds the custom field extension to the application during runtime. To be able to add the custom field to the user interface in the application during runtime, previously, various extension logic was added to the software system at different levels to allow the custom field to be dynamically added to the user interface during runtime. For example, as will be discussed below, extension logic is added to specific open data protocol (Odata) services, the business logic, the core data services (CDS), and also the database tables. This extension logic is leveraged to add the custom field to the software system.

Figure 1:
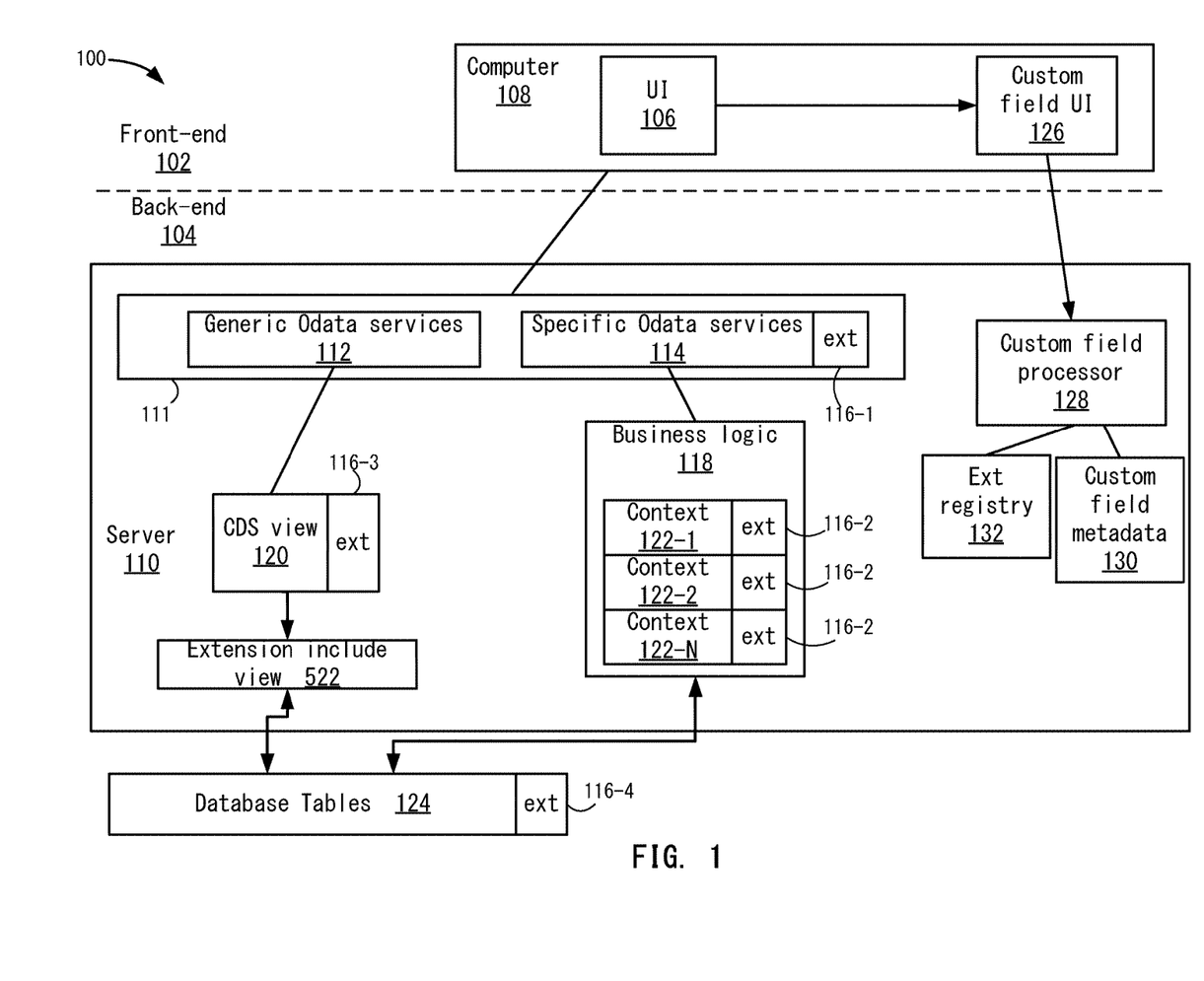
FIG. 1 depicts an example of a system for extending a software system for an application according to one embodiment.

FIG. 1 depicts an example of a system 100 for extending a software system for an application according to one embodiment. System 100 includes a front-end 102 and a back-end 104. Front-end 102 may include a client computer 108 that runs a browser displaying a user interface (UI) 106 for an application being run by back-end 104. Back-end 104 may include a database server 110 that connects to computer 108 in front-end 102. In this implementation, back-end 104 may be remotely located from front-end 102 and implementing a cloud-based application. In this case, back-end 104 runs the software system to allow by front-end 102 to access the application. In one embodiment, the application may include enterprise resource management software that is implemented by the software system and offered by a service provider.

Back-end 104 includes a database server 110 that can respond to requests from user interface 106. Server 110 includes an Odata service layer 111, which includes generic Odata services 112 and specific Odata services 114. Odata services provide application programming interfaces (APIs) that allow user interface 106 to provide queries to Odata service layer 111. Generic Odata services 112 may be generic across the software system for all different service requestors. Specific Odata services 114 may be specific to the service requestor. Extension logic 116-1 is created for specific Odata services 114 to allow a custom field to be created in the application.

The software system also includes business logic 118 and core data services (CDS) 120. Business logic 118 encodes business rules that determine how data can be created, displayed, stored, and changed. Business logic 118 includes a plurality of contexts 122-1-122-N. These contexts 122 can be extended and extension logic 116-2 is provided to allow these contexts to be extended with a custom field.

CDS view 120 is an infrastructure that is used to define and consume the data models in database tables 124 in a fast manner. Extension logic 116-3 is added to CDS view 120 to allow CDS view 120 to be extended according to a custom field.

Database tables 124 store data using a data model for the software system. Database tables 124 include extension logic 116-4 that allows tables 124 to be extended based on the custom field.

Accordingly, extension logic 116 is provided at different levels of the software system to allow for the run time generation of custom fields in user interface 106 for the application. In front-end system 102, when a service requestor wants to generate a custom field, the user may open a custom field user interface (UI) 126 directly from the application during runtime. For example, the application may include an add custom field entry on certain pages that the user can select. Within the custom field UI 126, the service requestor may specify parameters for the custom field to create and also associate the custom field with a business context. Other information for the field such as where it is used may also be input that will be described later. Once inputting the information, custom field UI 126 sends the parameters to a custom UI field processor 128 in back-end server 110. Custom field processor 128 may then generate custom field metadata 130 that can be used to generate the custom field in back-end 104. Then, custom field processor 128 uses extension logic 116 throughout the different levels of the software system to extend the application with the custom field.

Custom field UI 126 allows a service requestor to specify technical details of a custom field (e.g., business context, label, type, length, etc.) and also provides a where-used list. The where-used list is based on an extensibility registry 132 that identifies all Odata services, business contexts, and CDS views that can be extended. When selecting an entry in the where-used list, the underlying Odata services/business contexts/CDS view can be extended. For example, a user may extend a business context using custom field UI 126. The business context may be associated with whatever parts of the application the service requestor wants to extend.

Once the extension parameters are input into custom field UI 126, custom field processor 128 can determine information needed to generate the extension for the custom field. For example, an extension_include statement in business logic 118 is used to extend the business logic via DDIC-append. The field extensibility is explicitly prepared in the application. For example, database tables 124 and data dictionary (DDIC) structures include "extension_include" logic at 116-4. A data dictionary is a collection of descriptions of the data objects or items in a data model. An extension include may be an empty DDIC structure, which is an anchor point for extensions. The extension_include is part of the DDIC structure that is connected to a specific OData entity. All extension fields belong to DDIC-Append structures, which are appended to Extension Includes. This allows a custom field to be added via a DDIC-append command. Code in the application may also transfer custom fields between structures/internal tables via a move-corresponding command.

Extension_include view statements are used to extend CDS view 120 via a CDS view extension. Based on the selection in the where-used dialogue, selected CDS views are extended as well as propagating the extension field from the extension_include view into the selected CDS view. Also, based on the selection in the where-used dialogue, selected Odata services are extended as well by invalidating their metadata cache. A rebuild of the Odata service metadata processes the respective extensibility APIs, which assemble the metadata from the custom field metadata 130 to extend the Odata service.

For CDS view 120, extensible CDS views provide an extension_include association to an extension_include view, which is a CDS view on a database table containing only the key fields and custom fields from the extension_include. Custom fields are added to the extension_include view as soon as they are added to the persistency of the database. The extensible CDS views are extended on-demand when custom field UI 126 indicates a custom field should be created.

The Odata service includes the extension logic 116-1. The Odata service may be explicitly prepared for extensibility by calling an extensibility API to enhance the metadata or transfer extension data between internal and external structures.

The extension process at each level will now be described in more detail.

Extension of Business Logic 118 and Database Tables 124

As discussed above, extension_include statements may be used to extend the application with a custom field. Preparation needs to be provided in back-end 104 before the application can be extended with the custom field. In extension logic 116-2 in business logic 118 and extension logic 116-4 in database tables 124 may be prepared with extension_include logic. For example, for each extensible business context 122 (e.g., sales order header, sales order item, etc.), extension logic 116-2 defines a DDIC structure. This DDIC structure is associated with the extension_include logic. The DDIC structure is to be included in database table 124 and all related DDIC structures, such as those structures used for typing structures, internal tables, signature forms, function modules, methods, etc. Move_corresponding statements may be used to move data between structures when a custom field is generated.

Figure 2:
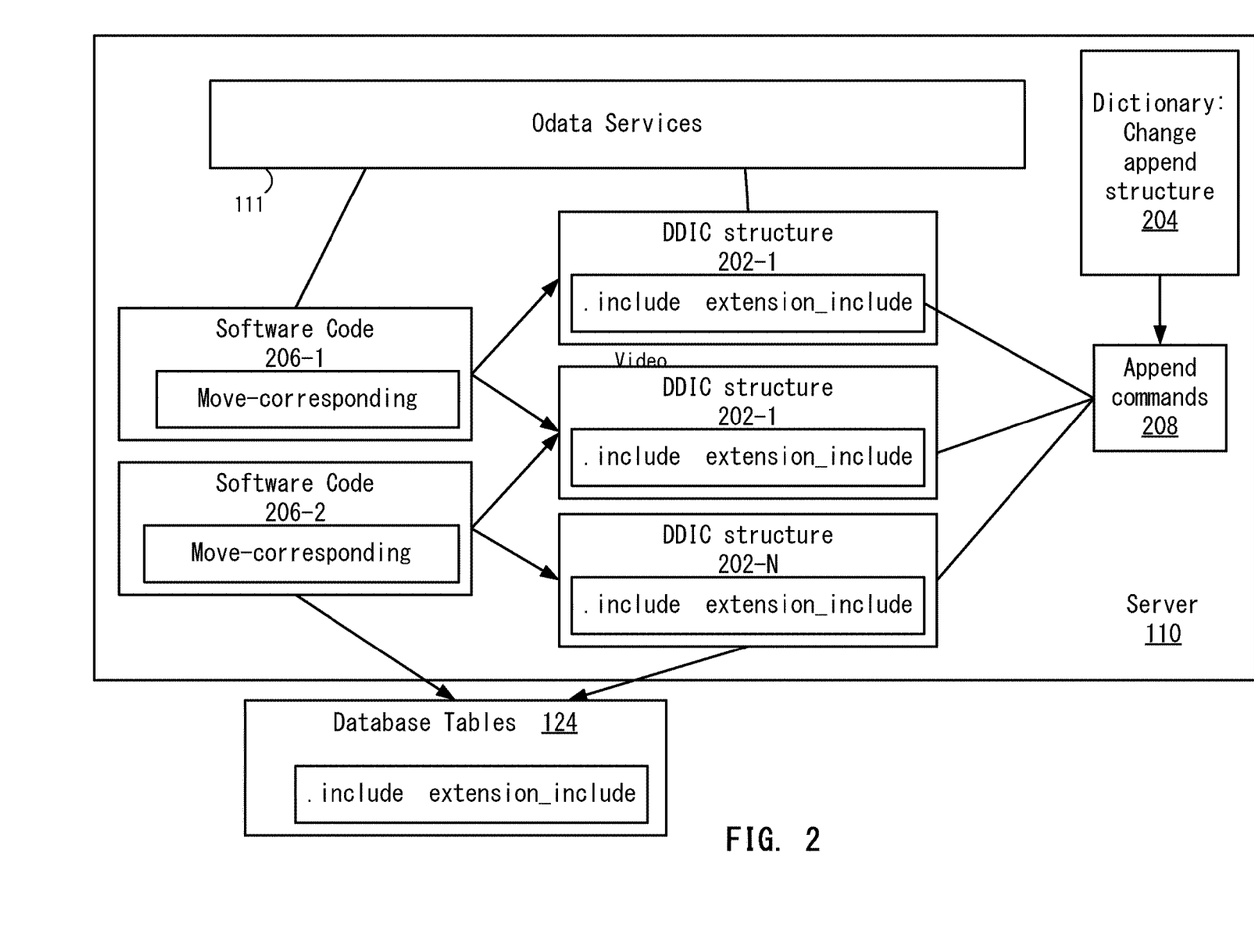
FIG. 2 depicts an example of the extension_include approach according to one embodiment.

FIG. 2 depicts an example of the extension_include approach according to one embodiment. When a service requestor generates a custom field, custom field processor 128 may generate a dictionary change append structure 204 that adds the custom fields to the original extension_include logic in extension logic 116-2 and extension logic 116-4. The append structure appends a custom field according to the custom field metadata 130. For example, structure 204 includes append commands 208 for the DDIC structure provided by the extension_include statements in extension logic 116-2 and extension logic 116-4.

DDIC structures 202-1-202-N include extension logic 116-2 shown as .include statements and extension_include statements. This may be found in business logic 118. When append commands 208 are received, at 206-1 and 206-2, the application executes software code of move-corresponding statements that appends data for the custom field to the different DDIC structures 202-1-202-N of business logic 118. Also, the move-corresponding statements also append the custom field to a table in database tables 124.

After activation, the custom field is available in database table 124 and all related DDIC structures in business logic 118. The extension_include is used to append the custom field in the DDIC structure that was created using extension logic 116-2 and extension logic 116-4 using .include statements and extension_include statements in extension logic 116-4.

By providing the .include statements and extension_include statements, and using move-corresponding statements, the custom field may be appended to structures that previously included DDIC structure. This allows the custom field to be extended automatically at runtime of the application.

CDS Extensibility

A new CDS view needs to be created when a custom field is added to the application. The new CDS view points to the core CDS view that is delivered by the service provider and adds some additional information. At activation, the information from the CDS view plus all its extensions are merged into the run time presentation of the application. The CDS view extension may add information based on the business context and the custom field metadata 130. Particular embodiments provide a system that is similar to the .include approach used for data dictionaries. Some problems exist when the extension of stacked CDS views becomes difficult and the creating/deleting or changing of CDS views may damage other service requestor extensions. The application provides an extension_include view statement that contains only the key fields of database tables 124. An extensible CDS view may now expose an association called an extension_include association command to this extension_include view statement. When a custom field is added via the custom field UI 126, custom field processor 128 creates the CDS view extensions. The extension field is automatically added to the extension_include view.

Figure 3:
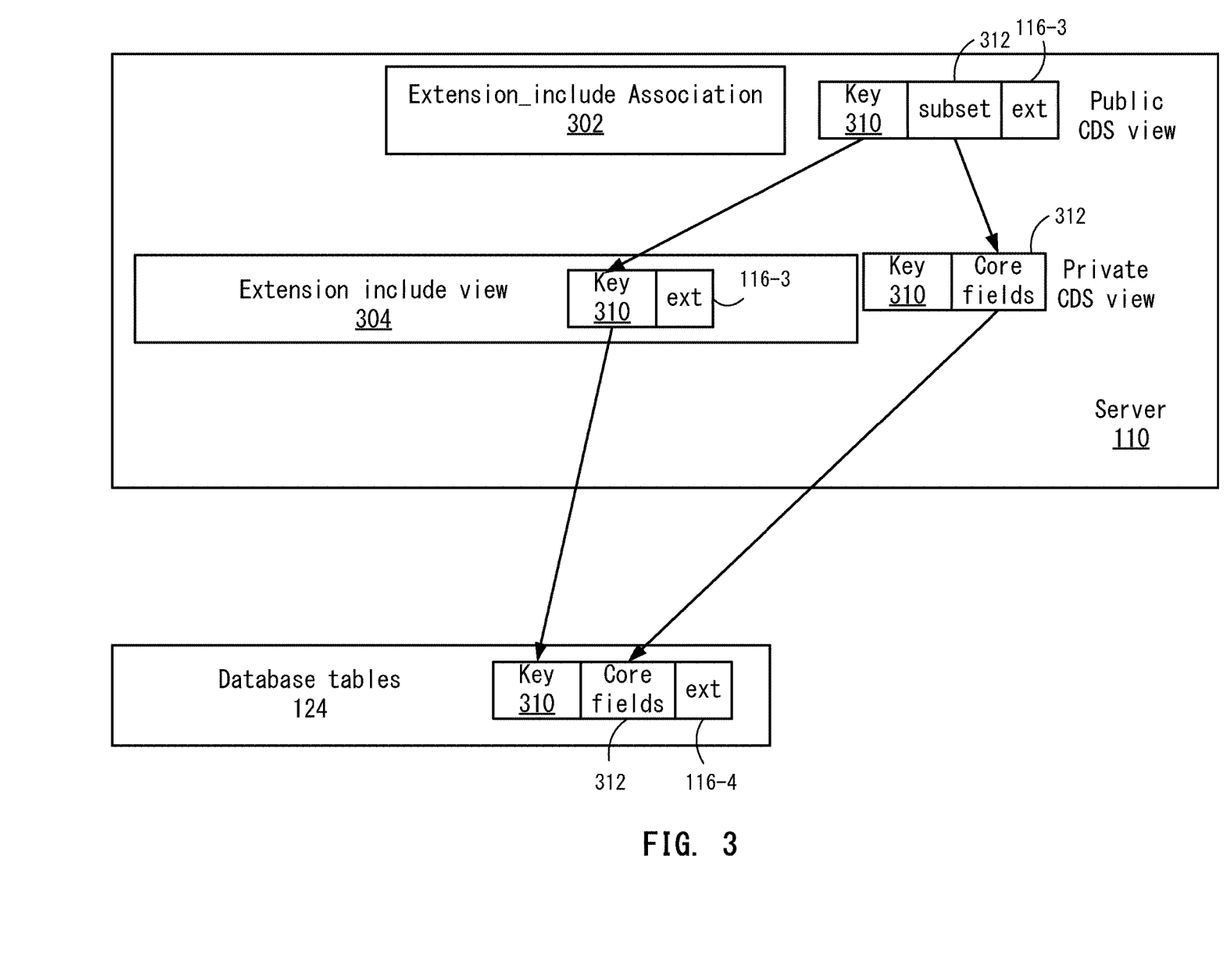
FIG. 3 depicts an example of adding an extension field to an extension_include view statement via a CDS view extension according to one embodiment.

FIG. 3 depicts an example of adding an extension field to an extension_include view statement via a CDS view extension according to one embodiment. At 302, an extension_include association statement is used to extend the CDS view. The extension_include association statement corresponds to a public CDS view that includes a key 310, subset 312 (e.g. additional data), and extension fields 116-3. The extension_include association statement references an extension_include view statement at 304 for extension logic 116-3. The extension_include view statement at 304 includes a key 310 and extension field logic 116-3. The extension_include view statement corresponds to a private CDS view that includes a key 310, and core fields 312, but not extension fields 116-3. The private views are not extended because they may not be stable.

The extension_include view statement can then be used to extend a key 310 in database table 124 that is associated with the extension field using extension logic 116-4. Through this, the public CDS view is added to database table 124 as a CDS view extension. This enables CDS views to be extended by propagating the extension_include association through all levels of the view hierarchy. It is not necessary to define a new extension_include association in each and every extensible CDS view. Only extension fields and the key fields are exposed via the extension_include association.

Odata Service Extensibility

Similar to the business logic and CDS views, Odata services are explicitly enabled for extensibility via extension logic 116-1. Specific Odata services 114 can be extended to handle the extension of the Odata services, which can prepare the data model for extensibility, enable the external meta model for extensibility, and call the APIs provided by the extensibility. The Odata service is bound against a DDIC structure. The DDIC structure includes an extension_include and an additional include for transient fields. The extension_include is added to the Odata service for persistence fields and transient fields. The extension_include is also added to application-specific APIs.

Having a custom field available in the DDIC structure does not expose it automatically. For example, adding a custom field can be realized by calling a generic extensibility method at the end of a method used to define properties in the OData services layer 111. The API does the following: based on the field extensibility metadata 130, the API adds extension fields from the underlying type definition to the metadata, set properties of the extension field, and defines new entities when the value help is involved. The custom field is only exposed where it is explicitly decided in the where-used definition to make it available to the Odata service. Therefore, the extensibility API will read custom field metadata 130 to decide if a custom field is to be exposed or not. Since each Odata service has to call certain APIs, by adding the methods that can process the extensions in extension logic 116-1 allows the addition of an extension field to an Odata service.

Extensibility Registry

Extension registry 132 may store a table where information is collected that is needed to extend database tables 124 and related DDIC structures of the application. For example, extension registry 132 includes the names of the extension-include statements that have been added to extension logic 116. This may store the business contexts that can be extended. Extension registry 132 also includes information for Odata services and CDS views, such as the relation to the business contexts and the generation directives (e.g., the name of the extension_include association statements).

Custom Field UI

Custom field UI 126 allows a user to specify parameters for the custom field, such as labels, technical name, and type of an extension field. Also, custom field UI 126 provides where-use information as to which business contexts to which the field will be persistently attached. For example, this may be based on the extensibility registry 132 to drive which extensions include the fields to be appended.

Figure 4:
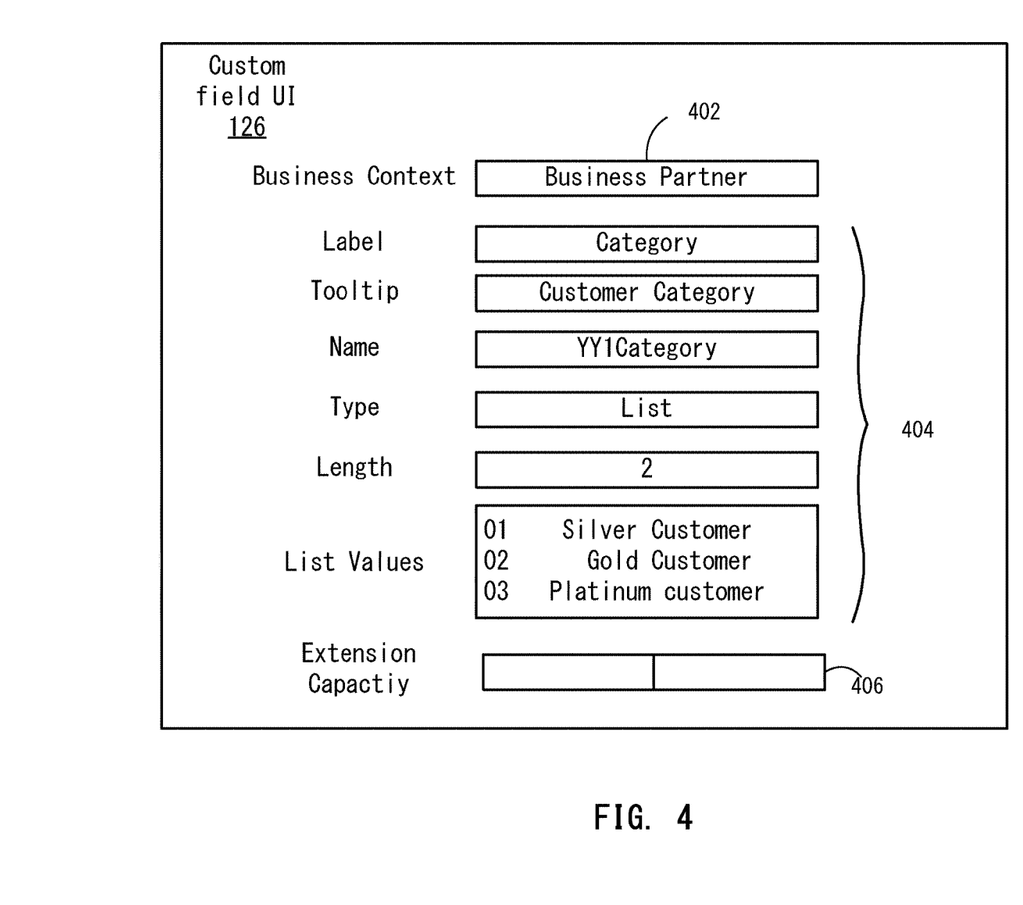
FIG. 4 depicts an example of a custom field user interface according to one embodiment.

FIG. 4 depicts an example of custom field UI 126 according to one embodiment. Custom field UI 126 is output from the runtime application. At 402, the business contexts can be selected. These include human readable text, such as business partner, sales order header, sales order item, which makes it understandable for the user where the field is logically placed. Other information defining the field is shown at 404 and includes the label, tool tip, name, type, length, and also list values. The important part of custom field UI 126 is associating business contexts with this extension field at 402. This allows custom field processor 128 to determine where to extend the application in back-end 104.

A where used dialog (not shown) allows the user to specify the places in the application where the extension field can be placed based on the business context. These places may be determined based on information in registry 132. The information from custom field UI 126 allows custom field processor 128 to determine the Odata service, business logic, and/or CDS view that is to be extended.

An extension capacity at 406 may indicate how many custom fields can still be added to the application. That is, there may be limit on how many custom fields a service requestor can add.

Custom Field Metadata

The metadata of the custom field may be stored in custom field metadata 130 in a new logical transport object referred to as a custom field transport object. The transport object includes the types, length, and label of the custom field as defined by custom field UI 126. Also, a list of code values and business contexts that are attached to the extension field are provided. Further, using the business contexts attached to the custom field, the object includes a list of CDS views where the extension field should be added and the list of Odata services where the extension data shall appear. Custom field processor 128 determines this information based on registry 132.

On activation of the extension field, the following entities may be created. When a field of a type "code list" is involved, a new table for the codes created, a new table for the code descriptions, a new CDS view for the codes, and a new CDS view for the code descriptions are created. Also, DDIC domain, DDIC data elements, DDIC appends, and CDS view extensions plus corresponding DDIC view appends are created.

The logical transport object may capture the following information. The business context (e.g., a key) describes the business object (BO) node (e.g., sales order header, sales order item, etc.). The business context can be identical to the name of the core CDS view. The core CDS view may be captured, which is the name of the core CDS view describing the BO node. This is used to derive the language-dependent description of the business context. If no core CDS view is available, a language-dependent text can be created within the extensibility registry 132. The name of the extension_include that is included in database table 124 and related DDIC structures is generated. Also, the extension_include for transient fields that are included in the DDIC structures of Odata services is determined. The extension_include view is the name of a CDS view containing only the key fields of database table 124. This will always be extended when a field is added and can be the target of the extension_include association. The field name suffix is also generated as a suffix for all extension fields for this business context. This may avoid naming collisions. Quota information may be generated that describes how many fields of which overall size can be generated by the service requestors.

A CDS view needs to be prepared for extensibility by providing a one-to-one association to the extension_include view. The corresponding alias for this association is to be specified in this registry. As the CDS view may expose data from several business contexts, the following layout may be used: the name of the CDS view (e.g., key), the name of the business context (e.g., key), name of the role (e.g., key), domain-to-retrieve text role, CDS alias, CDS draft alias, and CDS extension include draft view. The name of the role describes a role like ship-to or build-to when data of a specific business context are joined multiple times. Language-dependent description of this DDIC domain will be used to show a human readable text for this role. The CDS alias is the alias of the extension_include association that has been prepared in the extensible CDS view. The CDS draft alias is the alias of the extension_include draft association that has been repaired in the extensible CDS view. The CDS extension_include draft view is the name of the extension_include draft view.

The Odata services may be captured in a new object that includes the name of the Odata model (key), the name of the entity in the Odata model (key), the business context (key), the name of the role (key), the domain-to-retrieve text for the role, and the name of the CDS view. The domain-to-retrieve text for the role is the language-dependent description of the DDIC domain that will be used to show a human readable text for this role. The name of the CDS view is prepared and registered.

Overall Process Flow

Figure 5:
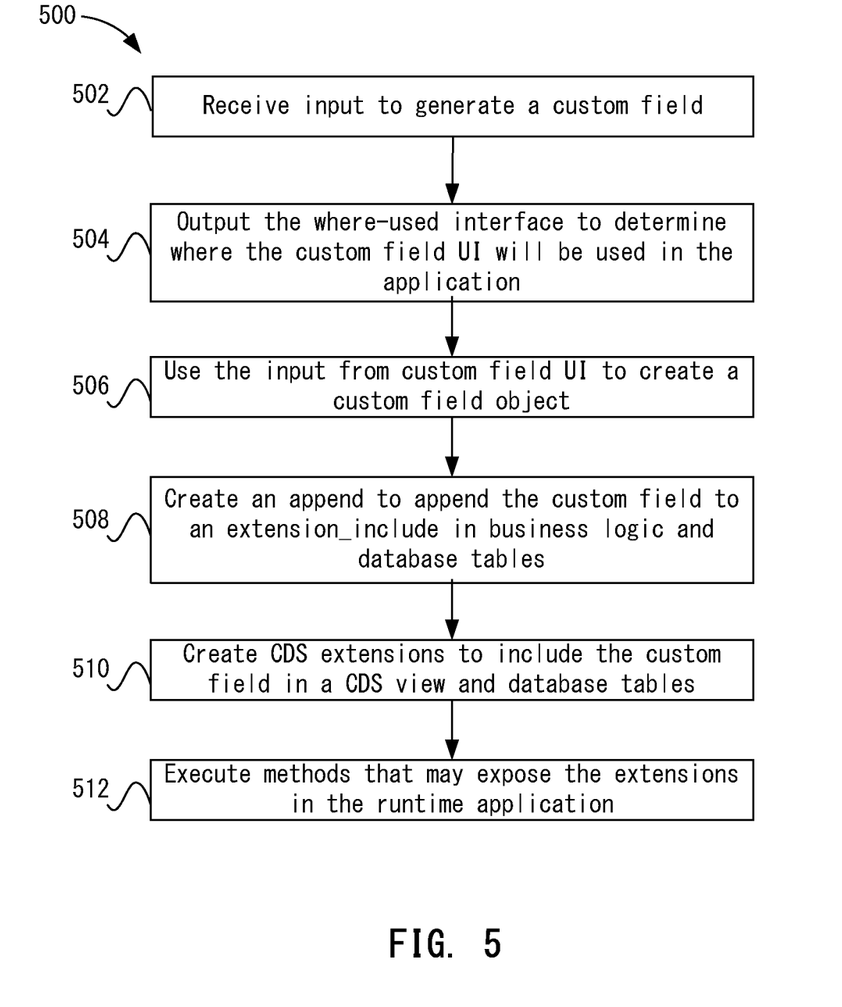
FIG. 5 depicts a flowchart of the overall process flow according to one embodiment.

FIG. 5 depicts a flowchart 500 of the overall process flow according to one embodiment. At 502, custom field UI 126 receives input to generate a custom field. The user can fill in information such as the business context, label, name, type, and length. Other information may also be provided. At 504, the where-used interface is output to determine where the custom field UI will be used in the application. This may indicate various business contexts.

At 506, custom field processor 128 uses the input from custom field UI 126 to create a custom field object. For example, a custom field has been generated as "DWLIST". Further, the where-used information associates the custom field object to an entity name and business context of the application.

Based on custom field object, custom field processor 128 can then extend the application in back-end 104. For example, at 508, custom field processor 128 creates an append to append the custom field to an extension_include in business logic 118 and database tables 124. The custom field is included by determining extension_include associated with a .include statements in both business logic 118 and database tables 124. The move-corresponding statement moves the data through the levels of the software system. Further, at 510, custom field processor 128 creates CDS extensions to include the custom field in CDS view 120 and database tables 124. This is performed by using an extension_include association for an extension_include view. The CDS extension is generated for CDS view 120, which then can use an extension_include by association to extend database table 124 with an extension_include view statement.

At 512, specific Odata services 114 can execute methods that may expose the extensions in the runtime application.

Figure 6:
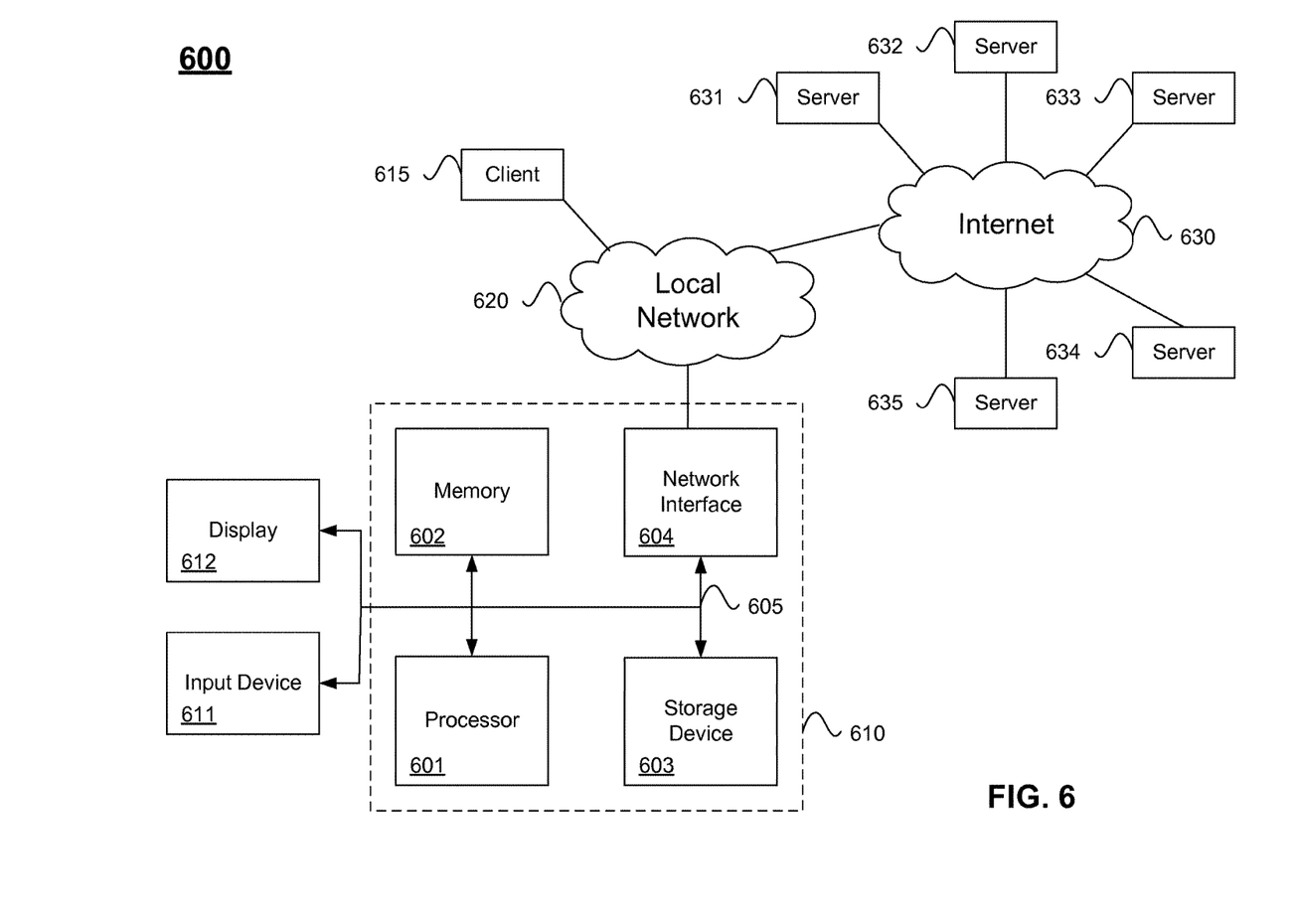
FIG. 6 illustrates hardware of a special purpose computing machine configured with the extension logic according to one embodiment.

FIG. 6 illustrates hardware of a special purpose computing machine configured with the extension logic according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   storing, by a computing device, extension logic for a business context for an application in a backend database system, wherein first extension logic is stored in a database table, second extension logic is stored in business logic that handles transactions in the backend system, and third extension logic is stored in an application programming interface to the application;
   receiving, by the computing device, one or more parameters for a custom field through a first portion of a user interface for a runtime version of the application, the one or more parameters for the custom field specifying an extension to a business context in which the custom field is associated;
   using, by the computing device, the business context in the one or more parameters to determine the extension logic associated with the business context in the backend database system; and
   using, by the computing device, the third extension logic to extend the database table with information for the custom field, the second extension logic to extend the business logic to handle transactions for the custom field in the backend system, and the third extension logic to extend the application programming interface to the application to expose the custom field on the user interface, wherein the custom field is added to a second portion of the user interface for the application during runtime of the application to specify the extension to the business context, the second portion of the user interface configured to handle a transaction using the custom field.

2. The method of claim 1, further comprising storing fourth extension logic with respect to a core data service used to read data from the database table, wherein a core data service view is extended with the custom field using the fourth extension logic.

3. The method of claim 2, wherein the core data service includes the key fields of the database table, wherein the custom field is added to the core data service view as a key field of the database table.

4. The method of claim 2, further comprising:
   storing a view statement in the fourth extension logic for the core data service, the view statement exposing an association to the core data service view that is used to extend the core data service view with the custom field.

5. The method of claim 1, wherein the second extension logic includes a statement in the business logic, the statement associated with a data dictionary structure in the database table for the business context.

6. The method of claim 5, wherein the statement is used to append the custom field to the data dictionary structure.

7. The method of claim 5, wherein using the second extension logic comprises using an include statement corresponding to the statement to extend the database table with the custom field.

8. The method of claim 5, further comprising:
   storing a move corresponding statement that is associated with the statement; and using the move corresponding statement to move data between layers of the data dictionary structure for the custom field.

9. The method of claim 1, wherein the third extension logic stored in the application programming interface is used to add the extension field to metadata to expose the custom field to the runtime version of the application.

10. The method of claim 9, wherein the third extension logic calls a method to expose the metadata for the application programming interface for the custom field.

11. The method of claim 1, further comprising:
registering the first extension logic stored in the business context in a registry; and
using the registry to add the custom field to the business context using the runtime version of the application.

12. The method of claim 11, wherein the registry is used to determine business contexts that are associable with the custom field.

13. The method of claim 1, further comprising:
generating a custom field object including metadata for the custom field; and
using the metadata to extend the application with the custom field.

14. A non-transitory computer-readable storage medium containing instructions, that when executed, control a computer system to be operable for:
storing extension logic for a business context for an application in a backend database system, wherein first extension logic is stored in a database table, second extension logic is stored in business logic that handles transactions in the backend system, and third extension logic is stored in an application programming interface to the application;
receiving one or more parameters for a custom field through a first portion of a user interface for a runtime version of the application, the one or more parameters for the custom field specifying an extension to a business context in which the custom field is associated;
using the business context in the one or more parameters to determine the extension logic associated with the business context in the backend database system; and
using the third extension logic to extend the database table with information for the custom field, the second extension logic to extend the business logic to handle transactions for the custom field in the backend system, and the third extension logic to extend the application programming interface to the application to expose the custom field on the user interface, wherein the custom field is added to a second portion of the user interface for the application during runtime of the application to specify the extension to the business context, the second portion of the user interface configured to handle a transaction using the custom field.

15. The non-transitory computer-readable storage medium of claim 14, further configured for storing fourth extension logic with respect to a core data service used to read data from the database table, wherein a core data service view is extended with the custom field using the fourth extension logic.

16. The non-transitory computer-readable storage medium of claim 14, wherein the second extension logic includes a statement in the business logic, the statement associated with a data dictionary structure in the database table for the business context.

17. The method of claim 16, wherein the statement is used to append the custom field to the data dictionary structure.

18. The method of claim 16, further comprising:
storing a move corresponding statement that is associated with the statement; and
using the move corresponding statement to move data between layers of the data dictionary structure for the custom field.

19. The non-transitory computer-readable storage medium of claim 14, wherein the third extension logic stored in the application programming interface is used to add the extension field to metadata to expose the custom field to the runtime version of the application.

20. An apparatus comprising:
one or more computer processors; and
a non-transitory computer-readable storage medium comprising instructions, that when executed, control the one or more computer processors to be operable for:
storing extension logic for a business context for an application in a backend database system, wherein first extension logic is stored in a database table, second extension logic is stored in business logic that handles transactions in the backend system, and third extension logic is stored in an application programming interface to the application;
receiving one or more parameters for a custom field through a first portion of a user interface for a runtime version of the application, the one or more parameters for the custom field specifying an extension to a business context in which the custom field is associated;
using the business context in the one or more parameters to determine the extension logic associated with the business context in the backend database system; and
using the third extension logic to extend the database table with information for the custom field, the second extension logic to extend the business logic to handle transactions for the custom field in the backend system, and the third extension logic to extend the application programming interface to the application to expose the custom field on the user interface, wherein the custom field is added to a second portion of the user interface for the application during runtime of the application to specify the extension to the business context, the second portion of the user interface configured to handle a transaction using the custom field.

* * * * *